United States Patent
Myles

(10) Patent No.: US 11,012,924 B2
(45) Date of Patent: May 18, 2021

(54) DISCOURAGING THE USE OF AN UNLICENSED SPECTRUM CHANNEL BY THIRD GENERATION PARTNERSHIP PROJECT (3GPP) TECHNOLOGIES

(71) Applicant: Cisco Technology, Inc., San Jose, CA (US)

(72) Inventor: Andrew Frederick Myles, Turramurra (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 33 days.

(21) Appl. No.: 16/571,663

(22) Filed: Sep. 16, 2019

(65) Prior Publication Data

US 2021/0084575 A1    Mar. 18, 2021

(51) Int. Cl.
*H04W 48/16* (2009.01)
*H04W 56/00* (2009.01)
(Continued)

(52) U.S. Cl.
CPC .......... *H04W 48/16* (2013.01); *H04L 5/0051* (2013.01); *H04W 56/004* (2013.01); *H04W 74/0808* (2013.01)

(58) Field of Classification Search
CPC .. H04L 5/0051; H04W 48/16; H04W 78/0808
See application file for complete search history.

(56) References Cited

U.S. PATENT DOCUMENTS

2016/0095114 A1*  3/2016  Kim ................... H04W 74/0816
                                                                            370/329
2016/0100404 A1*  4/2016  Han ........................ H04L 5/00
                                                                            370/329

(Continued)

FOREIGN PATENT DOCUMENTS

WO    2017026985 A1    2/2017

OTHER PUBLICATIONS

M. Maule, D. Moltchanov, P. Kustarev, M. Komarov, S. Andreev and Y. Koucheryavy, "Delivering Fairness and QoS Guarantees for LTE/Wi-Fi Coexistence Under LAA Operation," in IEEE Access, vol. 6, pp. 7359-7373, 2018, doi: 10.1109/ACCESS.2018.2793941. (Year: 2018).*

(Continued)

*Primary Examiner* — Gary Mui
(74) *Attorney, Agent, or Firm* — Edell, Shapiro & Finnan, LLC

(57) ABSTRACT

Techniques are described to provide to discourage use of an unlicensed spectrum channel by Third Generation Partnership Project (3GPP) technologies. In one example, a method includes performing a plurality of wireless transmissions for an unlicensed channel, wherein performing the plurality of wireless transmissions comprises: determining whether a next wireless transmission is proximate to a Discovery Reference Signal (DRS) transmission window; based on determining that the next wireless transmission is proximate to the DRS transmission window, determining whether the unlicensed channel is available; and based on determining that the unlicensed channel is available, starting the next wireless transmission before the DRS transmission window, wherein the next wireless transmission overlaps the DRS transmission window.

20 Claims, 4 Drawing Sheets

(51) Int. Cl.
*H04W 74/08* (2009.01)
*H04L 5/00* (2006.01)

(56) References Cited

U.S. PATENT DOCUMENTS

| | | | |
|---|---|---|---|
| 2017/0265082 A1* | 9/2017 | Jiang | H04W 72/042 |
| 2018/0241602 A1* | 8/2018 | Bhorkar | H04L 5/0053 |
| 2019/0059106 A1* | 2/2019 | Zhang | H04B 7/0695 |
| 2019/0075596 A1* | 3/2019 | Ye | H04L 5/0035 |
| 2019/0230707 A1* | 7/2019 | Bergljung | H04L 5/0053 |
| 2020/0305013 A1* | 9/2020 | Nurminen | H04L 5/0098 |

OTHER PUBLICATIONS

Y. Chen, M. Ding, D. Lopez-Perez, J. Li, Z. Lin and B. Vucetic, "Dynamic Reuse of Unlicensed Spectrum: An Inter-Working of LTE and WiFi," in IEEE Wireless Communications, vol. 24, No. 5, pp. 52-59, Oct. 2017, doi: 10.1109/MWC.2017.1700088. (Year: 2017).*

ETSI, "5 GHz RLAN; Harmonised Standard covering the essential requirements of article 3.2 of Directive 2014/53/EU", ETSI EN 301 893, V2.1.1, (May 2017), 122 pages.

3GPP, "Discussion on short fixed duration LBT for transmissions outside a COT", 3GPP TSG RAN WG1 Meeting #96, Broadcom, Athens, Greece, Feb. 25-Mar. 1, 2019, 6 pages.

* cited by examiner

DISCOURAGING THE USE OF AN UNLICENSED SPECTRUM CHANNEL BY THIRD GENERATION PARTNERSHIP PROJECT (3GPP) TECHNOLOGIES

TECHNICAL FIELD

The present disclosure relates to network equipment and services.

BACKGROUND

In some deployments, Wi-Fi® systems can coexist and compete with various Third Generation Partnership Project (3GPP) defined technologies including Licensed-Assisted Access (LAA), enhanced LAA (eLAA), further enhanced LAA (feLAA), and New Radio Unlicensed (NR-U). It is not clear that these 3GPP defined technologies will always share unlicensed channels with Wi-Fi systems in a manner that many Wi-Fi stakeholders would consider to be 'fair'. Additionally, there may be other adverse impacts from the 3GPP defined technologies operating in the same channel as a Wi-Fi system. Accordingly, there are significant challenges in providing networks in which Wi-Fi systems and 3GPP defined technologies may share unlicensed communication channels.

DESCRIPTION OF EXAMPLE EMBODIMENTS

Overview

Figure 1:
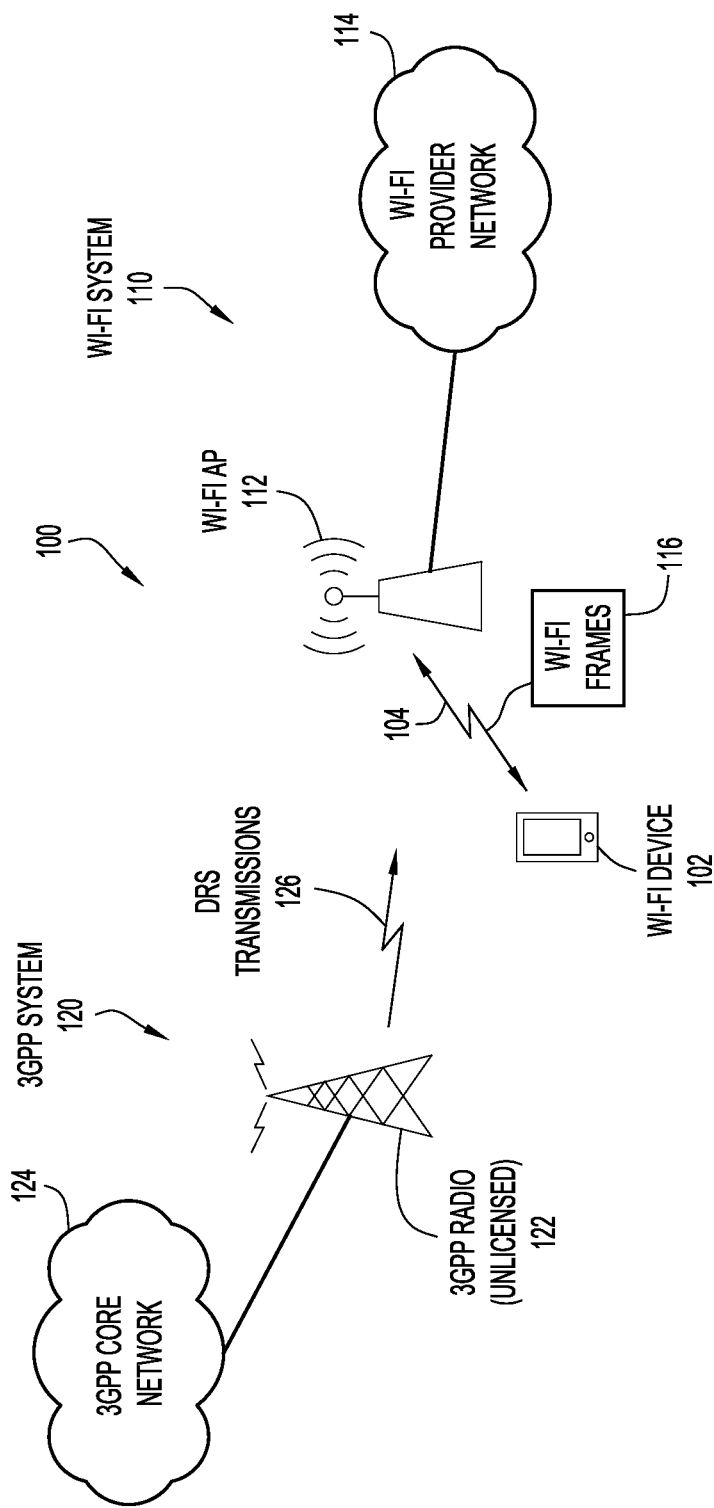
FIG. 1 is a diagram of a system in which techniques for discouraging the use of an unlicensed spectrum channel by Third Generation Partnership Project (3GPP) technologies may be implemented, according to an example embodiment.

Techniques presented herein provide for discouraging various Third Generation partnership Project (3GPP) technologies (e.g., one or more 3GPP radios) from using a same unlicensed channel as a Wi-Fi® system, thus allowing the Wi-Fi system to achieve a higher level of performance in an environment that is more likely to provide 'fair' access to Wi-Fi systems because they may be sharing unlicensed spectrum channels with other Wi-Fi systems using similar access methods, rather than 3GPP technologies using less similar and less 'fair' access methods.

In an example embodiment, a method is provided that may include performing a plurality of wireless (e.g., Wi-Fi) transmissions for an unlicensed channel, wherein performing the plurality of wireless transmissions comprises: determining whether a next wireless transmission is proximate to a Discovery Reference Signal (DRS) transmission window; based on determining that the next wireless transmission is proximate to the DRS transmission window, determining whether the unlicensed channel is available; and based on determining that the unlicensed channel is available, starting the next Wi-Fi transmission before the DRS transmission window, wherein the next wireless transmission overlaps the DRS transmission window.

Example Embodiments

Wi-Fi systems may soon coexist and compete with various 3GPP defined technologies, including Licensed-Assisted Access (LAA), enhanced LAA (eLAA), further enhanced LAA (feLAA), and New Radio Unlicensed (NR-U). It is not clear that these 3GPP technologies will always share unlicensed channels (e.g., frequencies) with Wi-Fi systems in a manner that many Wi-Fi stakeholders would consider to be 'fair'. Additionally, there may be other adverse impacts from 3GPP technologies operating in the same unlicensed channel as a Wi-Fi system. At the very least, the need to share an unlicensed channel with a 3GPP system can limit maximum Wi-Fi performance One option to avoid any potential unfairness or other adverse impacts from 3GPP technologies operating in the same unlicensed channel as a Wi-Fi system is for the Wi-Fi system to avoid channels in which such 3GPP technologies might operate. However, this option effectively allows the 3GPP technologies to choose the channels on which they desire to operate, thereby effectively pushing the Wi-Fi system into 'less desirable' channels.

A better option is one in which Wi-Fi systems can select the unlicensed channel(s) they want to use (e.g., a desirable channel) and encourage the 3GPP defined technologies to use different, and possibly 'less desirable', channels. At least one challenge is to define a solution that implements this option in a way that is consistent with the Listen Before Talk (LBT) principles that have been the basis of unlicensed channel sharing since 1997, when Institute of Electrical and Electronics Engineers (IEEE) 802.11 (e.g., Wi-Fi) was first standardized. These principles have been more recently codified in Europe by the European Telecommunications Standards Institute (ETSI) Technical Committee (TC) Broadband Radio Access Networks (BRAN) Harmonized European Standard (EN) 301 893 (ETSI BRAN EN 310 893).

Presented herein are techniques to provide for discouraging various 3GPP technologies (e.g., one or more 3GPP radios) from using a same unlicensed channel as a Wi-Fi system, thus allowing the Wi-Fi system to achieve a higher level of performance in an environment that is more likely to provide 'fair' access to Wi-Fi systems because they may be sharing unlicensed spectrum channels with other Wi-Fi systems using similar access methods, rather than 3GPP technologies using less similar and less fair access methods.

FIG. 1 is a block diagram of a system 100 in which techniques for discouraging the use of an unlicensed spectrum channel by 3GPP technologies (e.g., a 3GPP radio) may be implemented, according to an example embodiment. In at least one embodiment, the system 100 may include at least one Wi-Fi enabled device 102, a Wi-Fi system 110, and a 3GPP system 120. Wi-Fi system 110 may include a Wi-Fi access point (AP) 112, which may interface with a Wi-Fi provider network 114. 3GPP System 120 may include a 3GPP base station or radio 122, which may interface with a 3GPP core network 124.

Wi-Fi AP 112, also referred to herein more generally as a wireless AP, may be configured to perform Radio Frequency (RF) communications using unlicensed spectrum channels in accordance with any IEEE 802.11 (e.g., Wi-Fi) technologies. For example, Wi-Fi AP 112 may communicate (104)

with Wi-Fi device 102 via an unlicensed (e.g., Wi-Fi) channel using wireless (e.g., Wi-Fi) transmissions. In at least one embodiment, communications from Wi-Fi AP 112 to Wi-Fi device 102 may include transmitting one or more Wi-Fi frames 116 from Wi-Fi AP 112 to Wi-Fi device 102. It is to be understood that Wi-Fi device 102 can perform Wi-Fi transmissions towards Wi-Fi AP 112 using similar techniques. As referred to herein, the terms 'wireless' and 'Wi-Fi' can be used interchangeably.

In various embodiments, Wi-Fi provider network 114 may be any network configured to facilitate communications with one or more Wi-Fi devices (e.g., Wi-Fi device 102) via one or more Wi-Fi APs (e.g., Wi-Fi AP 112). For example, in some embodiments, Wi-Fi provider network 114 may include a Wireless Local Area Network (LAN) Controller (WLC), which may interface with Wi-Fi AP 112. As referred to herein, the terms 'unlicensed channel' and 'Wi-Fi channel' may be used interchangeably 3GPP radio 122 may be configured to perform RF transmissions using unlicensed spectrum channels. In some embodiments, 3GPP radio 122 may be a 4th Generation (4G)/Long Term Evolution (LTE) 3GPP radio, such as an evolved Node B (eNodeB or eNB), capable of performing unlicensed spectrum communications using LAA, eLAA, and/or feLAA technologies and/or licensed spectrum communications, as may be defined by 3GPP Technical Specifications (TSs). In still some embodiments, 3GPP radio 122 may be a 5th Generation (5G) 3GPP radio, such as a gNodeB or gNB, capable of performing unlicensed spectrum communications using NR-U technologies and/or licensed spectrum communications. In still some embodiments, 3GPP radio 122 may be any combination of 4G, 5G, and/or next generation (nG) 3GPP radios. In various embodiments, 3GPP core network 124 may be any 3GPP core network and/or combination of 3GPP core networks, such as an Evolved Packet Core (EPC) (e.g., for a 4G core network) and/or a 5G Core Network (5GC).

In various embodiments, Wi-Fi device 102 may be associated with any electronic device, machine, robot, etc. wishing to initiate a flow in system 100. The terms 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular/Wi-Fi telephone, an IP phone, any other device and/or combination of devices, component, element, and/or object capable of initiating voice, audio, video, media, or data exchanges within system 100. Devices discussed herein may also be inclusive of a suitable interface to a human user such as a microphone, a display, a keyboard, or other terminal equipment. Devices discussed herein may also be any device that seeks to initiate a communication on behalf of another entity or element such as a program, a database, or any other component, device, element, or object capable of initiating an exchange within system 100. It is to be understood that any number of devices may be present in system 100.

During operation, a 3GPP base station or radio utilizing LAA, eLAA, feLAA and/or NR-U technologies, such as 3GPP radio 122, transmits a frame called a Discovery Reference Signal (DRS) frame in a small DRS transmission window (e.g., DRS transmissions 126, as shown in FIG. 1) on a regular cadence to advertise its presence and provide network information, including synchronization information. A DRS frame can be up to about 1 millisecond (ms) in length and can typically be transmitted in a 5 ms DRS transmission window every 40 ms to allow a 3GPP system, such as 3GPP system 120, to operate in a particular channel.

A DRS frame is similar in many respects to a Beacon in Wi-Fi. A significant difference is that a Wi-Fi Beacon does not need to be sent at any particular time. This difference is explained by the different histories of Wi-Fi and the 3GPP technologies. For example, Wi-Fi technologies were designed to operate in an asynchronous channel environment in which anyone can operate at any time. In contrast, LAA, eLAA, feLAA, and NR-U 3GPP technologies were derived from LTE, which was optimized for a synchronous channel environment controlled by a single operator.

In at least one embodiment, a Wi-Fi system (e.g., Wi-Fi system 110 including Wi-Fi AP 112) can discourage 3GPP technologies, such as LAA, eLAA, feLAA and NR-U systems (e.g., 3GPP system 120 including 3GPP radio 122) from operating in the same unlicensed channel by: 1) determining or otherwise identifying the timing of the DRS transmission window of 3GPP radio 122; and 2) arranging to transmit one or more Wi-Fi frame(s) so that they substantially overlap the identified DRS transmission window.

The effect of executing the above operations may be to stop, impede, and/or otherwise discourage 3GPP radio 122 from operating in the unlicensed channel because it will not be able to advertise its presence or provide network information. As a result, 3GPP radio 122 can look for another unlicensed channel on which to operate.

In at least one embodiment, a full length Wi-Fi frame of about 6 ms can be transmitted in an unlicensed channel to completely overlap a DRS transmission window. In some embodiments, transmission of multiple Wi-Fi frames can be used to overlap a DRS transmission window. In still some embodiments, transmission of multiple Wi-Fi frames that may overlap a DRS transmission window may be transmitted by two or more Wi-Fi nodes (e.g., devices and/or APs). For example, Wi-Fi (e.g., wireless) transmissions overlapping a DRS transmission window may involve a data transmission from one Wi-Fi node and an acknowledgment (ACK) transmitted from another node regarding receipt of the data. In still another example, overlapping Wi-Fi transmissions can involve an exchange of Request To Send (RTS), Clear To Send (CTS), data, and ACK transmissions among two or more Wi-Fi nodes. It is to be understood that transmission of multiple Wi-Fi frames overlapping a DRS transmission window are to follow normal transmission rules (e.g., as stipulated by IEEE 802.11, EN 301 893, etc.) such that all frames transmitted together for a Transmission Opportunity (TXOP) may have a gap of 16 μsec between them and do not exceed transmission limits (e.g., typically 6 ms, but may be as long as 10 ms).

Transmission of Wi-Fi frames that overlap the DRS transmission window may involve a Wi-Fi AP (e.g., Wi-Fi AP 112) sometimes delaying its transmissions in order to overlap the DRS transmission window. This is a legitimate strategy that is legal under the EN 301 893 rules. There is a risk that Wi-Fi AP 112 may lose access to the channel while it is delaying its transmission. If it does, then it will be able to transmit immediately after the other system completes its transmission. Further, if the other system is a Wi-Fi system, then the goal of blocking, impeding, or otherwise discouraging access to the DRS transmission window by 3GPP radio 122 can still be achieved.

In various embodiments, a DRS transmission window may be identified by Wi-Fi AP 112 through any combination of: decoding DRS frames by the Wi-Fi AP 112 (e.g., if Wi-Fi AP 112 is configured with a capability to decode DRS frames); identifying transmissions that occur on a periodic basis (e.g., every 40 ms) within a particular window of time (e.g., 5 ms) for which the Wi-Fi AP 112 cannot decode (e.g., if Wi-Fi AP 112 is not configured with a capability to decode DRS frames); identifying periodic/cyclical transmissions within a particular window of time; combinations thereof; and/or the like. Other variations can be envisioned.

Generally, the benefit of discouraging 3GPP systems from operating in a desired unlicensed (e.g., Wi-Fi) channel may be greater than the impact of an occasional delayed transmission. From a Wi-Fi perspective, a channel may generally be more attractive to a Wi-Fi system if the Wi-Fi system is not sharing the channel with other systems, particularly 3GPP systems that use a different sharing mechanism.

A Wi-Fi AP/system can consider multiple factors to determine whether it may attempt to discourage DRS transmissions of a 3GPP system including, but not limited: determining that there is a condition present (e.g., a system setting, a network initiated trigger, a network condition, etc.) that indicates that discouraging DRS transmissions may be desired and/or performed; determining that there is a priority for discouraging DRS transmissions over performing other Wi-Fi transmissions (or, conversely, whether there is a higher priority for performing other Wi-Fi transmissions instead of attempting to discourage DRS transmissions); determining whether the Wi-Fi AP has enough data (which may include management traffic) to cover a DRS transmission window; determining a likelihood that another Wi-Fi node may transmit just before a DRS transmission window; determining that there is low load in the Wi-Fi system (e.g., in practice, the discouragement process may work best at low load, thus setting the channel up so that there may less likely be a 3GPP system in the channel when the Wi-Fi system has a high load); combinations thereof; and/or the like.

Consider an operational example in which Wi-Fi AP 112 has identified a DRS transmission window for DRS transmissions 126 performed by 3GPP radio 122 in an unlicensed channel that is desired for use by Wi-Fi AP 112 to perform wireless (e.g., Wi-Fi) transmissions of Wi-Fi frames 116 to/from Wi-Fi device 102. Wi-Fi AP 112 may perform normal wireless transmissions to Wi-Fi device 102.

During these transmissions, Wi-Fi AP 112 can determine whether a next wireless transmission may be proximate to the identified DRS transmission window. In various embodiments, a next wireless transmission may be considered proximate to an identified DRS transmission window if it is within 10's of milliseconds of the identified DRS transmission window. Different factors may be considered (e.g., if it is a priority to discourage DRS transmissions, etc.) in determining whether a next wireless transmission may be proximate to an identified DRS transmission window. Additionally, other factors may be considered for determining whether to attempt to discourage DRS transmissions, as discussed above, however, consider for the present example that Wi-Fi AP 112 determines whether a next wireless transmission may be proximate to the identified DRS transmission window and whether it has enough data to cover the DRS window.

Based on determining that a next wireless transmission may be proximate to the DRS transmission window and that that there is enough data to transmit to overlap the identified DRS transmission window, Wi-Fi AP 112 can, following a determination that the unlicensed channel is available using normal LBT rules (e.g., as prescribed by EN 301 893, IEEE 802.11, etc.), perform the next wireless transmission to start just before the DRS transmission window based on a time offset that is relative to an expected start time for the DRS transmission window. In at least one embodiment, the time offset may be at least 9 μsec. For example, Wi-Fi AP 112 can start the next wireless transmission at least 9 μsec before the expected start time for the DRS transmission window.

If it is determined that the unlicensed channel is not available before transmitting the next wireless transmission, the next transmission is not performed and Wi-Fi AP 112 may continue to perform wireless operations (e.g., transmitting when the channel is available) and may continue to determine whether a next wireless transmission may be proximate to the identified DRS transmission window.

As discussed above, in some cases, Wi-Fi AP 112 may determine that a next transmission is to be delayed to start just before an identified DRS transmission window. For cases involving such a delayed next transmission, Wi-AP 112 still determines whether the unlicensed channel is available using normal LBT rules before performing the delayed next wireless transmission.

Thus, a Wi-Fi system operating in accordance with techniques prescribed herein always follows the normal LBT rules, with the understanding that it may sometimes delay its transmissions to start just before a DRS transmission window. However, delaying Wi-Fi transmissions is allowed by the LBT rules as long as the Wi-Fi system always performs LBT in the slot just before transmission.

It should be noted that techniques presented herein do not promote operations related to jamming communication channels/signals. As is typically understood in the art, a jammer transmits energy into channel either regardless of the state of the channel or contrary to the well-established LBT rules. In contrast, techniques presented herein always follow normal LBT rules before performing Wi-Fi transmissions.

Additionally, because normal LBT rules are followed by the Wi-Fi system, techniques presented herein do not increase collisions. Rather techniques presented herein may merely operate to attempt to impede or discourage a 3GPP system from sending DRS frames reliably during an identified DRS transmission window. By starting a transmission just before the DRS transmission window, the Wi-Fi system may avoid a collision with the DRS too, assuming the 3GPP system uses a short LBT mechanism. Thus, techniques presented herein may, in some instances, operate to delay a DRS transmission so that it cannot be reliably sent in a particular DRS transmission window.

Figure 2:
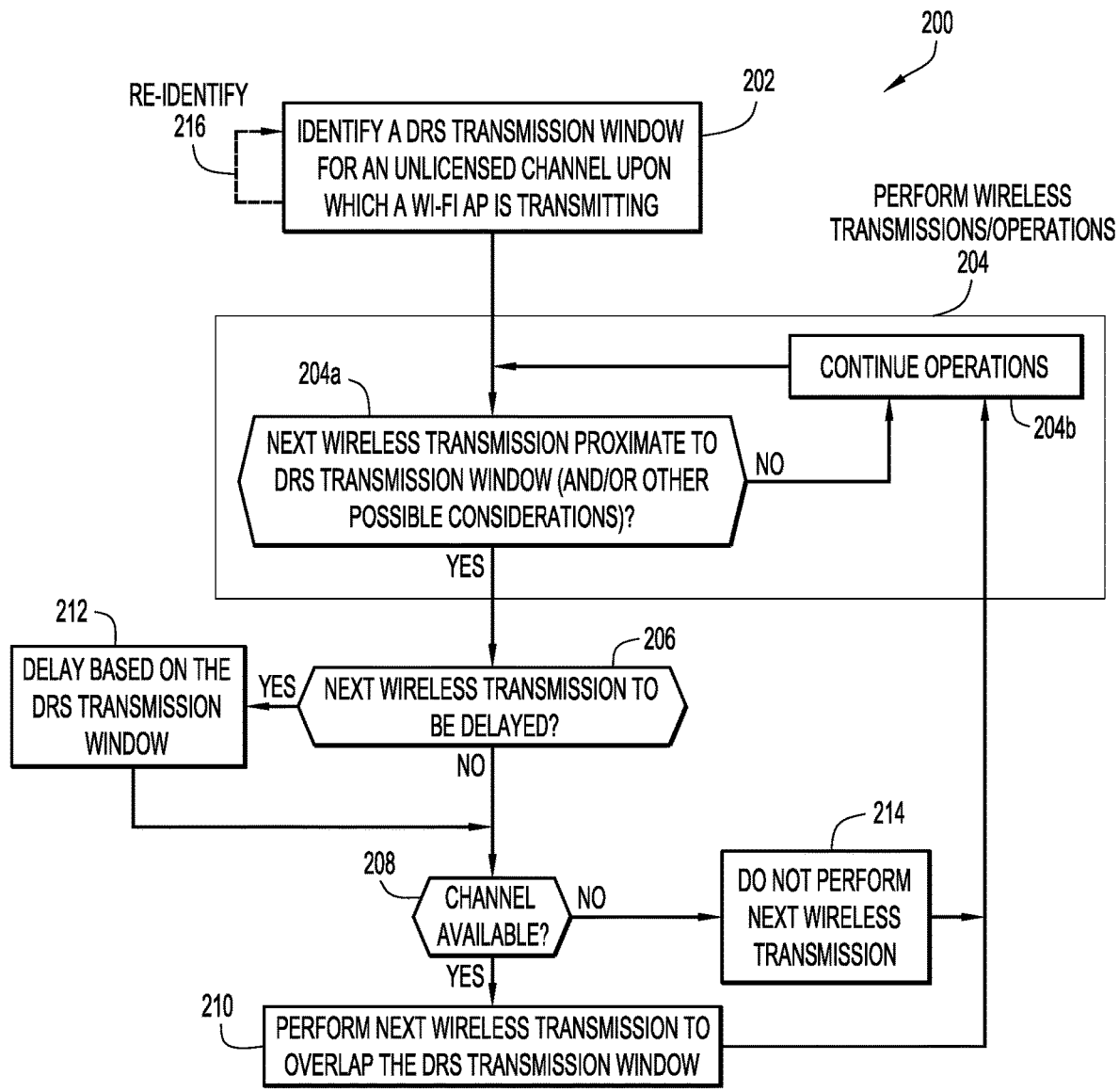
FIG. 2 is a flow chart depicting a method according to an example embodiment.

Referring to FIG. 2, FIG. 2 is a flow chart illustrating a method 200 that may be performed by a Wi-Fi AP (e.g., Wi-Fi AP 112) to discourage use of an unlicensed channel by 3GPP technologies, according to an example embodiment. At 202, the method may include the Wi-Fi AP identifying a DRS transmission window for an unlicensed channel (e.g., a desirable channel) upon which the Wi-Fi AP is transmitting. At 204, the Wi-Fi AP may perform wireless (e.g., Wi-Fi) transmissions/operations (e.g., LBT, wireless transmissions, etc.).

While performing the wireless transmissions/operations (204), Wi-Fi AP may determine at 204a, whether a next wireless transmission is proximate to the identified DRS transmission window such that the Wi-Fi AP may perform a next transmission in order to attempt to overlap the DRS transmission window. As discussed herein, other factors may be considered for the determination at 204a including, but not limited to: determining that there is a condition present (e.g., a system setting, a network initiated trigger, a network condition, etc.) that indicates that discouraging DRS transmissions may be performed by the Wi-Fi AP; determining that there is a priority for discouraging DRS transmissions over performing other wireless transmissions (or, conversely, whether there is a higher priority for performing other Wi-Fi transmissions instead of attempting to discourage DRS transmissions) by the Wi-Fi AP; determining whether the Wi-Fi AP has enough data (which may include management traffic) to cover the identified DRS transmission window; determining a likelihood that another Wi-Fi node may transmit just before the identified DRS transmission window; determining that there is low load in the Wi-Fi system; combinations thereof; and/or the like.

Based on determining at 204a that the next wireless transmission is not proximate to the identified DRS transmission window and/or based on one or more other possible factors/considerations, the Wi-Fi AP may continue to perform wireless operations (e.g., transmitting when the channel is available, etc.) 204b and may continue to determine at 204a whether a next transmission is proximate to the identified DRS transmission window.

Based on determining at 204a that a next transmission is proximate to the identified DRS transmission window, the Wi-Fi AP determines, at 206, whether the next wireless transmission is to be delayed in order to overlap with the identified DRS transmission window. Based on determining that the next wireless transmission is to be delayed at 206, the Wi-Fi AP delays the next wireless transmission based on the DRS transmission window, as shown at 212 such that the next wireless transmission can be started just before the DRS transmission window (following a determination that the channel is available, as discussed below).

Based determining that the next transmission is not to be delayed, the Wi-Fi AP can determine, at 208, whether the unlicensed channel is available using normal LBT mechanisms (e.g., as prescribed by EN 308 893, IEEE 802.11, etc.). Based on determining that the unlicensed channel is not available, the Wi-Fi AP does not perform the next wireless transmission, as shown at 214, and continues to perform wireless operations at 204 (e.g., transmitting when the channel is available and determining whether a next transmission is proximate to the DRS transmission window) and operations can continue therefrom.

However, based on determining at 208 that the unlicensed channel is available, the Wi-Fi AP performs the next wireless transmission to overlap the DRS transmission window, as shown at 210; thereby discouraging DRS transmissions by a 3GPP system. The next wireless transmission can be performed by starting the next wireless transmission before the identified DRS transmission window based on a time offset (e.g., at least 9 μsec) that is relative to the expected start time for the identified DRS transmission window (e.g., based on the time period associated with the periodic DRS transmission window). Following the next Wi-Fi transmission at 210, the Wi-Fi AP continues to perform wireless operations at 204 (e.g., transmitting when the channel is available and determining whether a next transmission is proximate to the DRS transmission window) and operations can continue therefrom.

In some embodiments, as shown at 216, the Wi-Fi AP may re-identify the DRS transmission window. For example, if the period of the DRS transmission window changes, if the DRS transmissions stop for a period of time and then re-starts, if the DRS transmission starts in another unlicensed channel that may be desired for use by the Wi-Fi AP, etc., the Wi-Fi AP may re-identify the DRS transmission window in order to perform techniques as described herein.

Figure 3:
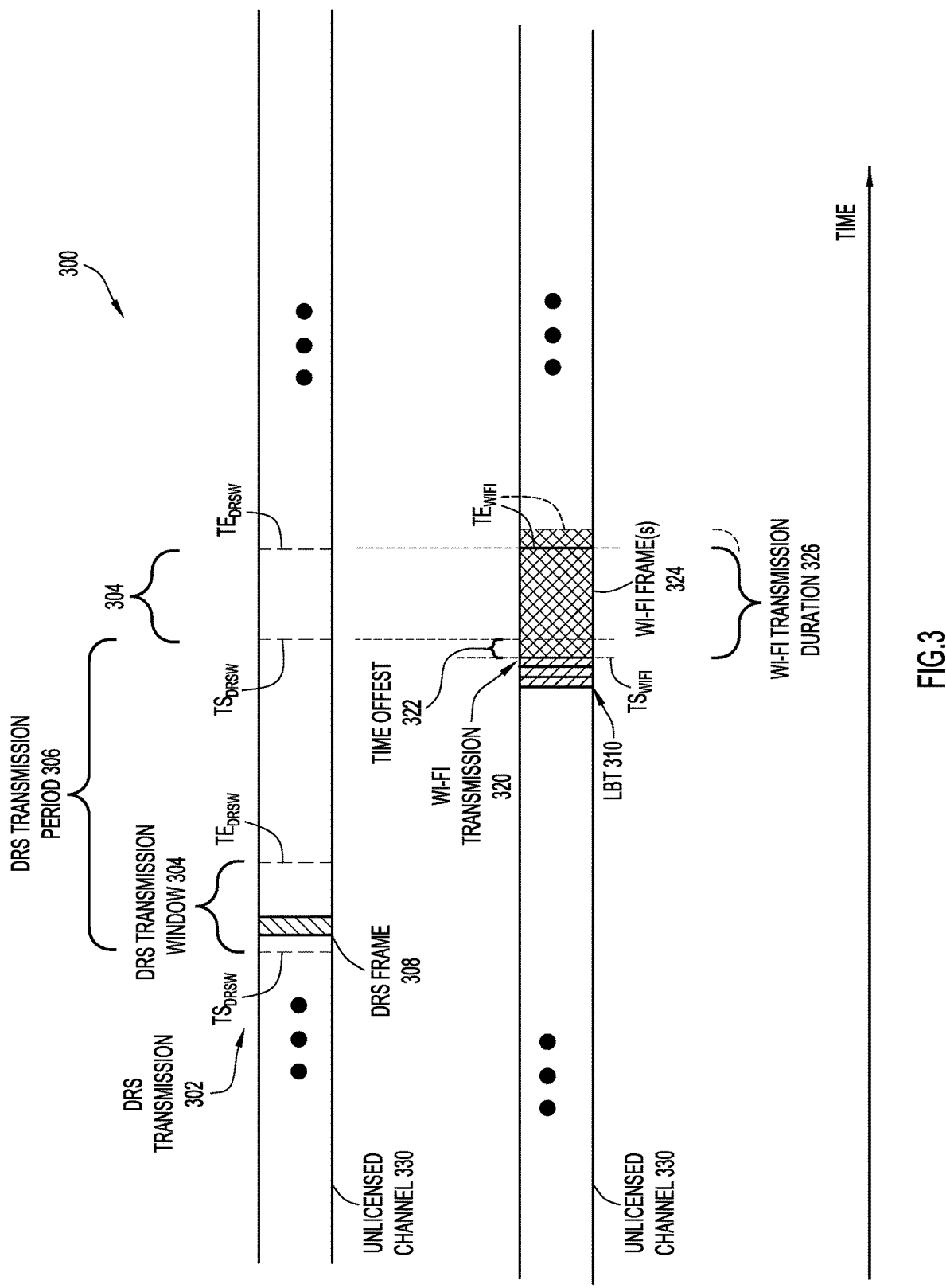
FIG. 3 is a schematic diagram illustrating example details that may be associated with an example wireless transmission that may be performed to overlap a Discovery Reference Signal (DRS) transmission window, according to an example embodiment.

Referring to FIG. 3, FIG. 3 is a schematic diagram 300 illustrating example details that may be associated with an example Wi-Fi transmission 320 for an unlicensed channel 330 that may be performed to overlap a DRS transmission window 304, according to an example embodiment. Various timing information is illustrated for schematic diagram 300 relative the unlicensed channel 330 within which both a Wi-Fi system (e.g., Wi-Fi system 110 including Wi-Fi AP 112) and a 3GPP system (e.g., 3GPP system 120 including 3GPP radio 122) may perform transmissions. DRS transmissions 302 are associated with the 3GPP system, while wireless (e.g., Wi-Fi) transmissions, such as a Wi-Fi transmission 320, are associated with the Wi-Fi system.

The DRS transmissions may include a DRS frame 308 that is transmitted within a DRS transmission window 304, which occur on periodic basis for a DRS transmission period 306. Each DRS transmission window 304 includes a start time ($TS_{DRSW}$) and an end time ($TE_{DRSW}$). Transmission of the DRS frame 308 can be performed at a time within each DRS transmission window 304.

By identifying the DRS transmission window 304, which occurs according the DRS transmission period 306, the Wi-Fi system can advantageously perform a given Wi-Fi transmission (e.g., a next Wi-Fi transmission) of one or more Wi-Fi frame(s) 324 to start at a start time ($TS_{WIFI}$) that is before the identified DRS transmission window 304 start time ($TS_{DRSW}$) based on a time offset 322 (e.g., at least 9 μsec) that is relative to the start time for the identified DRS transmission window 304 ($TS_{DRSW}$) such that the Wi-Fi frame(s) overlap the DRS transmission window for a Wi-Fi transmission duration 326; thereby discouraging the 3GPP system from transmitting the DRS frame 308 within the unlicensed channel 330.

As illustrated in FIG. 3, an end time ($TE_{WIFI}$) for the transmission duration 326 of the Wi-Fi frame(s) 324 can extend beyond the end time of the identified DRS transmission window 304 ($TE_{DRSW}$). Further as illustrated in FIG. 3, a determination is made that the unlicensed channel 330 is available using a normal LBT mechanism 310, in which the Wi-Fi system follows normal LBT rules (e.g., as prescribed by EN 301 893, IEEE 802.11, etc.) to determine whether channel 330 is available before performing the Wi-Fi transmission 320.

In summary, techniques presented herein provide for discouraging various 3GPP technologies (e.g., one or more 3GPP radios) from using the same channel as a Wi-Fi system, thus allowing the Wi-Fi system to achieve a higher level of performance in an environment that is more likely to provide 'fair' access to Wi-Fi systems because they may be sharing unlicensed spectrum channels with other Wi-Fi systems using similar access methods, rather than 3GPP technologies using less similar access methods.

Figure 4:
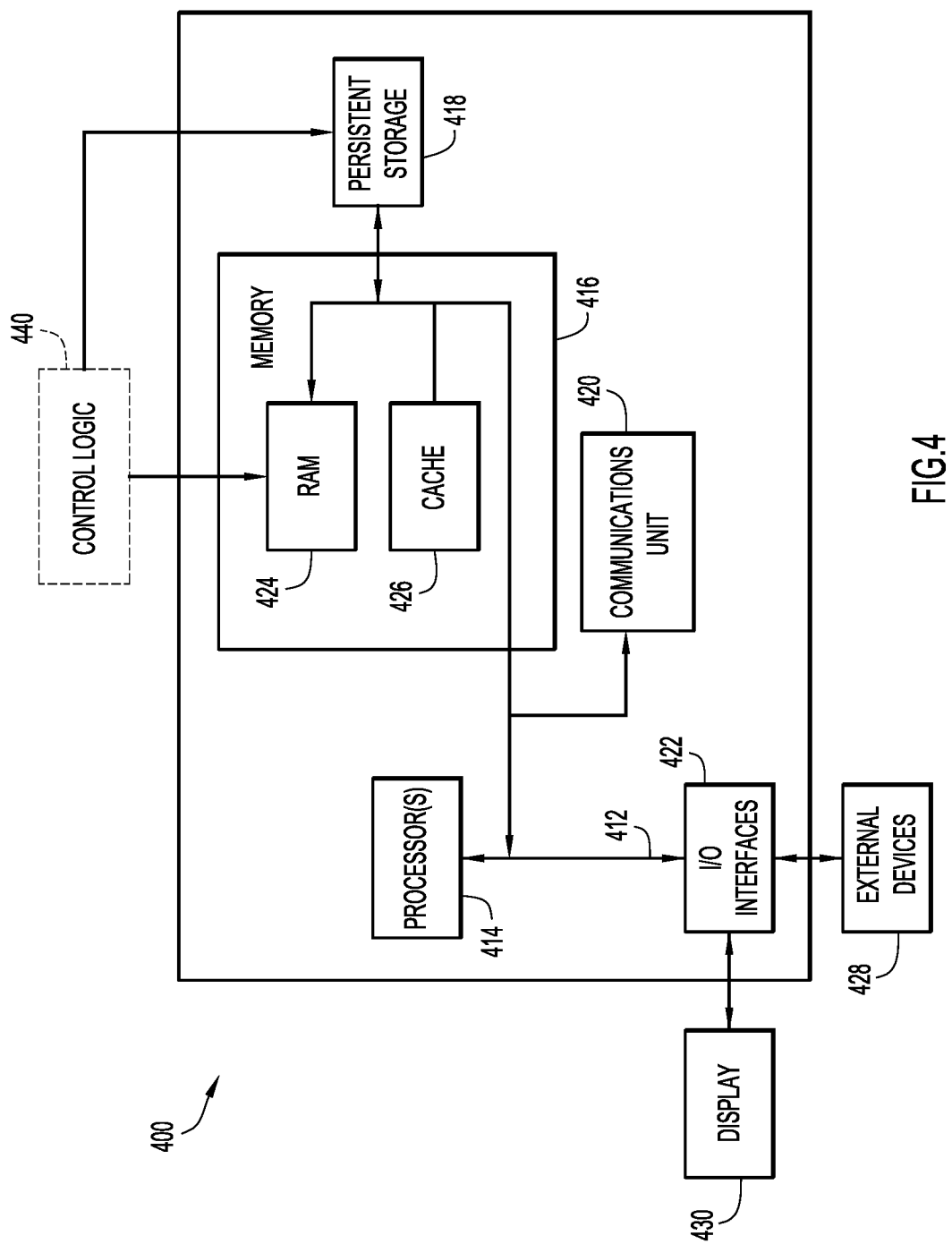
FIG. 4 is a hardware block diagram of a computing device that may perform functions for discouraging the use of an unlicensed spectrum channel by 3GPP technologies, in connection with the techniques depicted in FIGS. 1-3.

Referring to FIG. 4, FIG. 4 illustrates a hardware block diagram of a computing device 400 that may perform the functions of a wireless AP (e.g., Wi-Fi AP 112) for discouraging the use of an unlicensed spectrum channel by 3GPP technologies, referred to herein in connection with FIGS. 1-3. It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media, which can be inclusive on non-transitory computer readable storage media. In the depicted embodiment, memory 416, which may be inclusive of one or more memory element(s), may include random access memory (RAM) 424 and cache memory 426. In general, memory 416 can include any suitable volatile or non-volatile computer readable storage media. Instructions for control logic 440 may be stored in memory 416 and/or persistent storage 418 for execution by processor(s) 414. When the processor(s) 414 execute control logic 440, the processor(s) 414 are caused to perform the operations described above in connection with FIGS. 1-3.

One or more programs and/or other logic may be stored in persistent storage 418 for execution by one or more of the respective computer processors 414 via one or more memory element(s) of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422, which may be inclusive of one or more network interface cards (NICs), allows for input and output of data with other devices that may be connected to computing device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

In one form, a computer-implemented method is provided that may include: performing a plurality of wireless transmissions for an unlicensed channel, wherein performing the plurality of wireless transmissions comprises: determining whether a next wireless transmission is proximate to a Discovery Reference Signal (DRS) transmission window; based on determining that the next wireless transmission is proximate to the DRS transmission window, determining whether the unlicensed channel is available; and based on determining that the unlicensed channel is available, starting the next wireless transmission before the DRS transmission window, wherein the next wireless transmission overlaps the DRS transmission window.

The method may further include identifying the Discovery Reference Signal (DRS) transmission window for the unlicensed channel based on periodic DRS transmissions. Identifying the DRS transmission window and performing the plurality of wireless transmissions may be performed by a wireless access point.

The method may further include, based on determining that the next wireless transmission is proximate to the DRS transmission window, determining whether the next wireless transmission is to be delayed to overlap the DRS transmission window with the next wireless transmission; and based on determining that the next wireless transmission is to be delayed, delaying the next wireless transmission based on the DRS transmission window prior to starting the next wireless transmission. Determining whether the unlicensed channel is available is performed using a Listen Before Talk (LBT) mechanism.

The next wireless transmission may be started at a time offset before the DRS transmission window. The time offset may be at least 9 microseconds before the DRS transmission window. In some instances, the next wireless transmission may include one wireless frame having a transmission time that is greater than or equal to the time offset plus the DRS transmission window. In some instances, the next wireless transmission may include a plurality of wireless frames having a transmission time that is greater than or equal to the time offset plus the DRS transmission window. In still some instances, the plurality of wireless frames may be transmitted by at least two wireless nodes.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   performing a plurality of wireless transmissions for an unlicensed channel, wherein performing the plurality of wireless transmissions comprises:
      determining whether a next wireless transmission is proximate to a Discovery Reference Signal (DRS) transmission window;
      based on determining that the next wireless transmission is proximate to the DRS transmission window, determining whether the unlicensed channel is available; and
      based on determining that the unlicensed channel is available, starting the next wireless transmission before the DRS transmission window, wherein the next wireless transmission overlaps the DRS transmission window.

2. The method of claim 1, further comprising:
   identifying the Discovery Reference Signal (DRS) transmission window for the unlicensed channel based on periodic DRS transmissions.

3. The method of claim 2, wherein identifying the DRS transmission window and performing the plurality of wireless transmissions is performed by a wireless access point.

4. The method of claim 1, further comprising:
based on determining that the next wireless transmission is proximate to the DRS transmission window, determining whether the next wireless transmission is to be delayed to overlap the DRS transmission window with the next wireless transmission; and
based on determining that the next wireless transmission is to be delayed, delaying the next wireless transmission based on the DRS transmission window prior to starting the next wireless transmission.

5. The method of claim 1, wherein determining whether the unlicensed channel is available is performed using a Listen Before Talk (LBT) mechanism.

6. The method of claim 1, wherein the next wireless transmission is started at a time offset before the DRS transmission window.

7. The method of claim 6, wherein the time offset is at least 9 microseconds before the DRS transmission window.

8. The method of claim 6, wherein the next wireless transmission comprises one wireless frame having a transmission time that is greater than or equal to the time offset plus the DRS transmission window.

9. The method of claim 6, wherein the next wireless transmission comprises a plurality of wireless frames having a transmission time that is greater than or equal to the time offset plus the DRS transmission window.

10. The method of claim 6, wherein the plurality of wireless frames are transmitted by at least two wireless nodes.

11. One or more non-transitory computer readable storage media encoded with instructions that, when executed by a processor, cause the processor to perform operations, comprising:
performing a plurality of wireless transmissions for an unlicensed channel, wherein performing the plurality of wireless transmissions comprises:
determining whether a next wireless transmission is proximate to a Discovery Reference Signal (DRS) transmission window;
based on determining that the next wireless transmission is proximate to the DRS transmission window, determining whether the unlicensed channel is available; and
based on determining that the unlicensed channel is available, starting the next wireless transmission before the DRS transmission window, wherein the next wireless transmission overlaps the DRS transmission window.

12. The media of claim 11, further encoded with instructions that, when executed by the processor, cause the processor to perform further operations, comprising:
identifying the Discovery Reference Signal (DRS) transmission window for the unlicensed channel based on periodic DRS transmissions.

13. The media of claim 11, further encoded with instructions that, when executed by the processor, cause the processor to perform further operations, comprising:
based on determining that the next wireless transmission is proximate to the DRS transmission window, determining whether the next wireless transmission is to be delayed to overlap the DRS transmission window with the next wireless transmission; and
based on determining that the next wireless transmission is to be delayed, delaying the next wireless transmission based on the DRS transmission window prior to starting the next wireless transmission.

14. The media of claim 11, wherein determining whether the unlicensed channel is available is performed using a Listen Before Talk (LBT) mechanism.

15. The media of claim 11, wherein the next wireless transmission is started at a time offset of at least 9 microseconds before the DRS transmission window.

16. A wireless access point comprising:
at least one memory element for storing data; and
at least one processor for executing instructions associated with the data, wherein executing the instructions causes the wireless access point to perform operations, comprising:
performing a plurality of wireless transmissions for an unlicensed channel, wherein performing the plurality of wireless transmissions comprises:
determining whether a next wireless transmission is proximate to a Discovery Reference Signal (DRS) transmission window;
based on determining that the next wireless transmission is proximate to the DRS transmission window, determining whether the unlicensed channel is available; and
based on determining that the unlicensed channel is available, starting the next wireless transmission before the DRS transmission window, wherein the next wireless transmission overlaps the DRS transmission window.

17. The wireless access point of claim 16, wherein executing the instructions causes the wireless access point to perform further operations, comprising:
identifying the Discovery Reference Signal (DRS) transmission window for the unlicensed channel based on periodic DRS transmissions.

18. The wireless access point of claim 16, wherein executing the instructions causes the wireless access point to perform further operations, comprising:
based on determining that the next wireless transmission is proximate to the DRS transmission window, determining whether the next wireless transmission is to be delayed to overlap the DRS transmission window with the next wireless transmission; and
based on determining that the next wireless transmission is to be delayed, delaying the next wireless transmission based on the DRS transmission window prior to starting the next wireless transmission.

19. The wireless access point of claim 16, wherein determining whether the unlicensed channel is available is performed using a Listen Before Talk (LBT) mechanism.

20. The wireless access point of claim 16, wherein the next wireless transmission is started at a time offset of at least 9 microseconds before the DRS transmission window.

* * * * *